United States Patent
Fäth et al.

(10) Patent No.: US 11,325,436 B2
(45) Date of Patent: May 10, 2022

(54) AIR SPRING SYSTEM HAVING AN AIR SPRING DEVICE AND METHOD FOR ASSEMBLING AN AIR SPRING SYSTEM

(71) Applicant: SAF-HOLLAND GmbH, Bessenbach (DE)

(72) Inventors: Stefan Fäth, Aschaffenburg (DE); Stefan Wallmeier, Goldbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 325 days.

(21) Appl. No.: 16/611,751

(22) PCT Filed: May 2, 2018

(86) PCT No.: PCT/EP2018/061169
§ 371 (c)(1),
(2) Date: Nov. 8, 2019

(87) PCT Pub. No.: WO2018/206361
PCT Pub. Date: Nov. 15, 2018

(65) Prior Publication Data
US 2020/0062061 A1 Feb. 27, 2020

(30) Foreign Application Priority Data
May 8, 2017 (DE) .................... 10 2017 109 806.2

(51) Int. Cl.
*B60G 11/28* (2006.01)
*B60G 11/27* (2006.01)
(Continued)

(52) U.S. Cl.
CPC ............. *B60G 11/28* (2013.01); *B60G 11/27* (2013.01); *F16F 9/0454* (2013.01); *F16F 9/057* (2013.01);
(Continued)

(58) Field of Classification Search
CPC .. B60G 11/28; B60G 11/27; B60G 2206/424; B60G 2204/126; F16F 9/057; F16F 9/0454
See application file for complete search history.

(56) References Cited

U.S. PATENT DOCUMENTS 3,664,681 A * 5/1972 Thaxton ................. B60G 11/56
280/124.116
6,398,179 B1 6/2002 Soles
(Continued)

FOREIGN PATENT DOCUMENTS

DE 29616257 11/1996
DE 102004011466 A1 10/2004
(Continued)

OTHER PUBLICATIONS

European Patent Office; International Search Report; dated Jul. 31, 2018.

*Primary Examiner* — Pamela Rodriguez
(74) *Attorney, Agent, or Firm* — Price Heneveld LLP

(57) ABSTRACT

An air spring system for a commercial vehicle including an air spring device configured to be arranged in an interface region on a link, the air spring system configured such that, in the case of locking of the air spring device, an engagement element can be introduced into a receiving region, and, by way of an offset movement along an offset direction, the engagement element can be transferred from the receiving region into a positively locking region, in which the engagement element interacts in a positively locking manner with a positively locking element along a positively locking direction which differs from the offset direction.

21 Claims, 3 Drawing Sheets

(51) Int. Cl.
*F16F 9/04* (2006.01)
*F16F 9/05* (2006.01)

(52) U.S. Cl.
CPC .. *B60G 2204/126* (2013.01); *B60G 2206/424* (2013.01)

(56) References Cited

U.S. PATENT DOCUMENTS

| | | |
|---|---|---|
| 2007/0200312 A1 | 8/2007 | Chamberlin et al. |
| 2013/0099459 A1* | 4/2013 | Remboski .............. B60G 11/27 280/124.16 |
| 2017/0106709 A1* | 4/2017 | Lauer ..................... B60G 11/28 |
| 2017/0320365 A1* | 11/2017 | Lorenz .................... B60G 3/26 |
| 2020/0276874 A1* | 9/2020 | Lorenz ................. B60G 21/005 |

FOREIGN PATENT DOCUMENTS

| | | |
|---|---|---|
| DE | 102006030452 A1 | 1/2008 |
| DE | 102010000620 A1 | 9/2011 |
| DE | 102014008121 A1 | 12/2015 |
| WO | 2017028970 A1 | 2/2017 |

* cited by examiner

AIR SPRING SYSTEM HAVING AN AIR SPRING DEVICE AND METHOD FOR ASSEMBLING AN AIR SPRING SYSTEM

BACKGROUND OF THE INVENTION

The present invention relates to an air spring system having an air spring device, and to a method for mounting an air spring system.

Air spring systems are well known from the prior art. They are typically used to suspend a vehicle axle or to change a ride height position of a vehicle. Customary constituent parts of the air spring system are a piston and an air bellows, it being possible for the air bellows and the piston to be displaced relative to one another. Here, in the case of compression or rebound, the air bellows rolls on an outer face of the piston. To this end, the air bellows is preferably manufactured from an elastic material, by way of which a folding movement can be brought about during rolling. In addition, a damping action is brought about by virtue of the fact that a fluid, in particular air, flows to and fro via a constricted cross section between a working space which is provided by way of the air bellows and the piston and a chamber which is configured in the piston. The vibrations which are introduced are damped on account of the constricted cross section and the associated friction.

The damping behavior of an air spring device of this type is dependent on the available air volume. In order to increase the volume, it is therefore known to connect the working space to an additional volume in the form of a separate additional container. The prior art, for example document DE 10 2004 011 466 A1, has disclosed an air spring system, the piston of which is connected via a connecting duct to an additional volume container.

The mounting and dismantling of the air spring system is complicated and time-consuming, however. In addition, fixing elements are required which fill the installation space and can restrict the size of the additional container.

It is therefore an object of the present invention to provide an air spring system which can be mounted or dismantled in an uncomplicated manner.

SUMMARY OF THE INVENTION

According to the invention, an air spring system is provided, in particular for a commercial vehicle, having an air spring device which can be arranged in an interface region on a link, the air spring device, in particular the interface region, being designed in such a way that, in the case of locking of the air spring device, an engagement element can be introduced into a receiving region, and, by way of an offset movement along an offset direction, the engagement element can be transferred from the receiving region into a positively locking region, in which the engagement element interacts in a positively locking manner with a positively locking element along a positively locking direction which differs from the offset direction. In comparison with the connecting mechanisms which are known from the prior art, it is possible by means of the air spring system to attach the air spring device to the link merely by way of a fitting movement and an offset movement. It is provided, in particular, that the engagement element engages behind the positively locking element and thus ensures an attachment of the air spring device to the link. This simplifies the mounting and the dismantling of the air spring device, with the result that service and repair costs can also advantageously be lowered. In particular, the air spring system is provided for a vehicle axle, it being possible for the link to be arranged pivotably on a vehicle frame, and said link being intended to mount the vehicle axle. The air spring device which is arranged between the link and the vehicle frame comprises, for example, a piston and an air bellows. Said air bellows preferably has an elastically deformable cylindrical shell which is fixed on one side on the piston, for example via a clamping ring, and on the other side on the vehicle frame. In the case of a rebound movement, a working volume which is enclosed by the piston and the air bellows and in which a fluid, in particular air, is collected, is reduced in size. Furthermore, the air can escape from the working volume through a cross section in the piston, as a result of which a damping effect can be achieved for the air spring and therefore for a pivoting movement of the link element with the mounted vehicle axle. Furthermore, it is preferably provided that the receiving region and the positively locking region are arranged in the interface region. For example, the receiving region adjoins the positively locking region directly. As a result, merely comparatively small offset movements are advantageously required, in order to transfer the engagement element into the positively locking region. The interface region is fixed, in particular, by way of the region, in which the air spring device, in particular the piston, bears against the link. Furthermore, a guide channel is preferably provided which fixes the offset direction and along which a part of the guide element is moved in the case of the transfer of the engagement element into the positively locking region. Moreover, it is preferably provided that the air spring system is designed in such a way that the air spring device can be attached reversibly to the link, that is to say the air spring device can be released again from the link and can be reattached. In order to release it, the offset movement and the fitting movement take place in the reverse sequence and in each case in opposite directions. Furthermore, it is provided that the fitting direction differs from the offset direction. The offset direction particularly preferably runs substantially perpendicularly with respect to the fitting direction. Moreover, it is preferably provided that an extent (measured in the fitting direction) of the engagement element is from 1.1 to 3 times, preferably from 1.05 to 2.1 times and particularly preferably from 1 to 1.6 times greater than the thickness (measured in the same direction) of the link in the interface region. It has been shown for the ratio between 1 and 1.6 that engagement elements of this type are sufficiently stable, in order firstly to endure in the case of the loads which are to be expected during operation, and secondly to take up as little installation space as possible on a lower side of the chassis, which lower side faces away from the chassis, which has an advantageous effect on the creative freedom during the design of an additional container to be arranged here. Furthermore, it is preferably provided that a single engagement element or a plurality of engagement elements is/are provided. A plurality of attachments can be realized in the interface region by means of a plurality of engagement elements, as a result of which a more stable attachment can advantageously be realized.

In accordance with a further embodiment of the present invention, a securing mechanism is provided which, in the mounted state, counteracts a movement which is opposed to the offset direction. This advantageously prevents the engagement element from accidentally being moved out of the positively locking region again during operation. For example, the securing mechanism has pin-shaped securing elements which are arranged on an end side of the air spring device, which end side faces the chassis. It is also conceivable that the securing mechanism comprises a spring element which is prestressed in such a way that a restoring force counteracts a movement which is opposed to the offset direction. Furthermore, it is conceivable that the guide channel has, for example on its inner side, a latching element or a latching contour, with which that part of the engagement element which engages through the guide channel interacts when the engagement element has assumed its final position in the positively locking region. Furthermore, it is conceivable to utilize a rotational effect on the air spring device, by the coiling or substructure of the air spring shell being adapted in a targeted manner, in order to achieve a rotation, for example a rotation to the right, of the air spring device under pressure loading. A type of self-locking action can advantageously be achieved as a result. It is particularly preferably provided that the engagement element is a hook element, it being possible for the hook element to be jammed with the positively locking region. For example, as viewed in the offset direction, the positively locking region is wedge-shaped, with the result that the hook element jams with the widening positively locking region in the case of the movement along the circulating direction or the offset direction. Furthermore, it is conceivable that one end of the guide channel forms a stop for the engagement element.

It is preferably provided that the engagement element interacts, in the mounted state, in a frictionally locking manner with the positively locking element along a direction which runs parallel to the offset direction, in particular even in a state of the air spring, in which it is mounted but not loaded. As a result, an undesired movement which is opposed to the offset direction can be counteracted. To this end, the surface of the positively locking means is structured or roughened, for example. In the mounted state, the engagement element is preferably secured along a direction which runs parallel to the offset direction in a merely frictionally locking manner against a movement which is opposed to the offset direction. This can mean, inter alia, that no positively locking securing means is provided which counteracts an offset counter to the offset direction (for dismantling purposes). This results in an air spring system which can be manufactured particularly simply, with the result that costs can be saved.

It is provided in a further embodiment of the present invention that the offset movement is a translational and/or rotational movement. The fitting movement is preferably a translational movement, and the offset movement is a rotational movement. Furthermore, it is conceivable that the offset movement is a translational movement and a rotational movement. The probability that the engagement element accidentally leaves the positively locking region again during operation is advantageously reduced by way of comparatively complex offset movement routing. To this end, the guide channel is preferably of slotted guide-like configuration. It is conceivable here that the translational movement and the rotational movement follow one another. It is particularly preferably provided that the interface region is configured as a bayonet closure.

It is expediently provided that the link has, in order to form a receiving region, a recess for the introduction of the engagement element. In particular, the recess defines the receiving region, and is preferably of complementary configuration with respect to the shape of the engagement element in a sectional plane which runs perpendicularly with respect to the fitting movement. The engagement element and the receiving region are preferably configured in the manner of a key/lock principle, with the result that it can advantageously be prevented that an unsuitable air spring device is accidentally connected to the link. It is also conceivable that the receiving region is larger than an area which is assigned to the engagement element in the sectional plane, in order to make simple insertion possible. Furthermore, it is preferably provided that the engagement element is arranged on the end side of the air spring device.

It is provided in accordance with a further embodiment of the present invention that the engagement element, in particular a part of the engagement element which engages behind the positively locking element, is inclined by an angle with respect to a plane which runs perpendicularly with respect to the fitting direction. As a result, secure fixing of the air spring device on the link can be made possible in a particularly simple way. In particular, if the air spring system is used in a commercial vehicle, expensive additional fastening means, such as screws or the like, can be dispensed with as a result of said type of fixing. The angle preferably assumes a value between 1.5° and 4.5°, preferably between 0.8° and 2.2°, and particularly preferably between 1.3° and 1.8°. Tolerance compensation and a sufficient clamping action can advantageously be ensured by means of a comparatively small inclination of this type between 1.3° and 1.8°. That part of the engagement element which is inclined by the angle with respect to a plane which runs perpendicularly with respect to the fitting direction preferably configures an (in particular, distal) end section of the engagement element, in order to simplify the mounting.

Furthermore, it is preferably provided that a further or second interface region is provided in addition to the interface region. As a result, the air spring device can be attached selectively to the link on two different regions which are offset with respect to one another. In particular, this selection is dependent on a vehicle side, on which the link is attached. By means of the further interface region, links for a right hand and a left hand vehicle side can be manufactured in a common production line. It is particularly preferably provided that the interface region and the further interface region are offset with respect to one another in a direction which runs perpendicularly with respect to a driving direction, that is to say along a vehicle transverse direction. It is conceivable here that the interface region and the further interface region overlap at least partially.

It is provided in one preferred embodiment of the present invention that the engagement element is part of the air spring device, and the positively locking element is part of the link. This embodiment proves advantageous, in so far as, in the case of the configuration of a plurality of interface regions, more cutouts can be manufactured in the link and a set of engagement elements can be manufactured on the air spring device, with the result that material and manufacturing complexity are reduced in comparison with an air spring system, in the case of which the plurality of sets of engagement elements are arranged on the link. Furthermore, it is preferably provided that the engagement element is arranged on an end side of the air spring device, in particular of the piston, which end side faces the link in the mounted state.

It is expediently provided that the engagement element engages through the link in the mounted state. As a result, it can advantageously be prevented that the engagement element has to engage around the link, in order to engage behind the link. Accordingly, an air spring system which is particularly economical in terms of installation space can thus be provided.

Furthermore, it is preferably provided that the air spring device can be arranged on an upper side of the link, which upper side faces a chassis. In particular, the air spring device is attached directly to the link or to the upper side. As a result, the engagement element can be of as small dimensions as possible in a direction which runs parallel to the offset direction.

It is advantageously provided that at least one locking aid is provided for indicating a mounted state of the air spring device. It can be detected from the outside in a simple way by means of the locking aid whether the engagement element is arranged in the positively locking region. This is advantageous, in particular, when the engagement element and its positioning are concealed, and the user therefore cannot directly see clearly the state, in which the engagement element is arranged. The locking aid is, for example, a marking on the link and/or on the air spring device, in particular on the outer side thereof, on the basis of the orientation of which marking the technician or a vehicle driver can detect whether the engagement element is arranged in a positively locking region. Markings on an outer side of the link and the air spring device are conceivable, for example, which markings are arranged so as to be aligned with respect to one another in the mounted state of the air spring device. As an alternative, it is also conceivable that the locking aid emits an acoustic or visual light signal when the engagement element is arranged in the positively locking region.

It is expediently provided that the air spring system has an additional container which, in the mounted state, is arranged or can be arranged on a lower side of the link, which lower side faces away from the chassis, the additional container having a recess, in which, in the mounted state of the air spring system, the engagement element is arranged at least partially. It is provided, in particular, that, in the mounted state, the recess extends congruently with respect to the receiving region and the positively locking region as viewed in a direction which runs parallel to the positively locking direction. As a result, the air spring device can advantageously be removed from the link, without it being necessary for the additional container to be released beforehand. The air spring device and the additional container preferably lie above one another in the direction which runs parallel to the positively locking direction.

It is provided in a further embodiment of the present invention that the air spring system has a fluid duct for the exchange of gas between the air spring device and the additional container, the fluid duct preferably being arranged between two engagement elements in the mounted state. Preferably it is provided that the fluid duct is arranged centrally on the end side facing the link in the mounted state. Furthermore, it is provided that the engagement elements project radially to the outside with their ends. Furthermore, as viewed in the radial direction, the engagement elements are preferably arranged in the outermost third, preferably in the outermost fourth or particularly preferably in the outermost fifth of the end side of the air spring device, in particular of the piston.

It is preferably provided that an extent length (measured in the offset direction) of the engagement element is smaller than an extent length (measured in the offset direction) of the positively locking region. This can advantageously bring it about that the engagement element does not directly leave the positively locking region in the case of a movement of the engagement element counter to the offset direction.

According to the invention, furthermore, an air spring system is provided, in particular an air spring system according to the invention as described above, having an additional container which can be arranged in an interface region on a link, the additional container being designed in such a way that, in the case of locking of the additional containers, an engagement element can be introduced into a receiving region, and, by way of an offset movement along an offset direction, the engagement element can be transferred from the receiving region into a positively locking region, in which the engagement element interacts in a positively locking manner with a positively locking element along a positively locking direction which differs from the offset direction. Everything for the air spring system according to the invention having an air spring device and the advantages thereof can likewise be transferred analogously to the air spring system according to the invention having an additional container, and vice versa.

A further subject matter of the present invention is a method for mounting an air spring system, in particular an air spring system as claimed in one of the preceding claims, comprising the steps:

fitting of the air spring device by way of a fitting movement along a fitting direction, an engagement element being received in a receiving region, and transferring of the engagement element from the receiving region into the positively locking region by way of an offset movement along an offset direction with the formation of a positively locking connection along a positively locking direction which differs from the offset direction. Everything for the air spring system according to the invention having an air spring device and the advantages thereof can likewise be transferred analogously to the method according to the invention for mounting an air spring system, and vice versa.

BRIEF DESCRIPTION OF THE DRAWINGS

Further advantages and features result from the following description of preferred embodiments of the subject matter according to the invention with reference to the appended figures. Individual features of the individual embodiment can be combined with one another here within the scope of the invention.

In the figures:

FIG. 3 shows a detailed view of the air spring device from FIG. 2a; and

DETAILED DESCRIPTION OF THE PREFERRED EMBODIMENTS

Figure 1A:
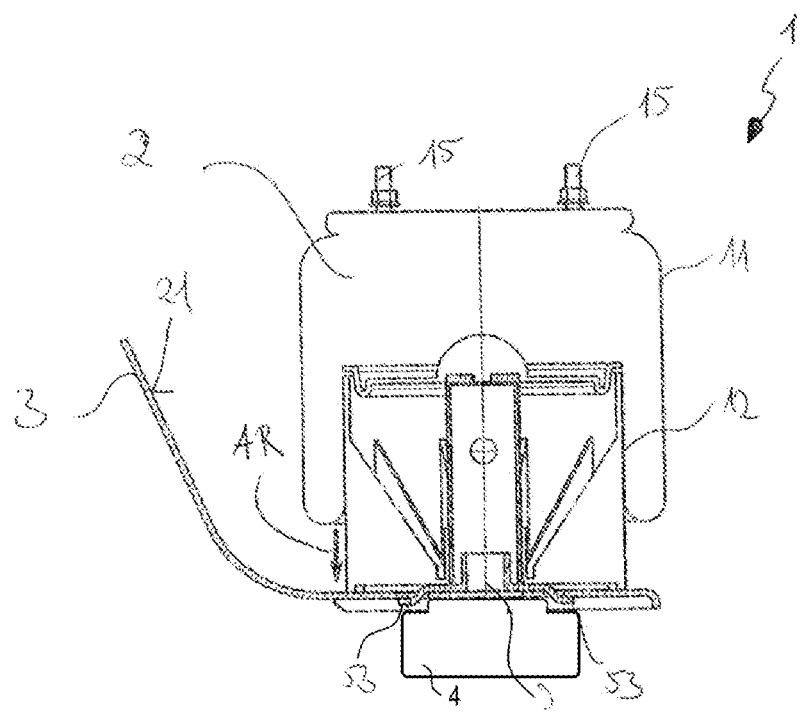
FIGS. 1a and 1b show an air spring system in accordance with one preferred embodiment of the present invention.
Figure 1B:
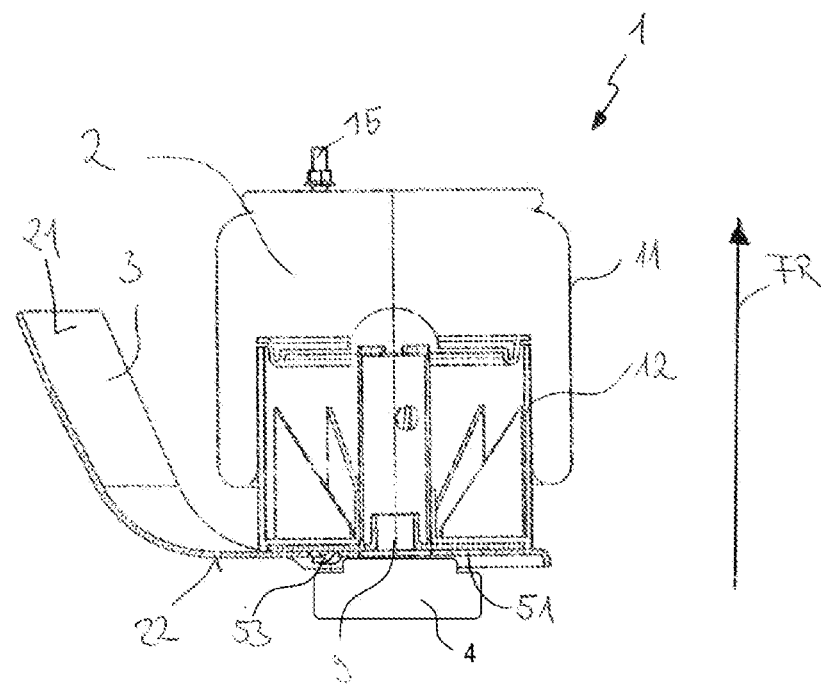

FIGS. 1a and 1b show an air spring system 1 in accordance with a first preferred embodiment of the present invention. This is, in particular, an air spring system 1 which is provided for the suspension of a wheel axle on a commercial vehicle, for example a semitrailer. Essential constituent parts of an air spring system 1 of this type are a link 3, an additional container 4 and an air spring device 2. The link 3 is preferably attached, for example at its one end, to a vehicle body such that it can be pivoted about a pivoting axis, and supports the wheel axle. In order to damp a translational movement, for example an up and down movement, of the wheel axle during operation, the link 3 is attached via the air spring device 2 on a further region of the vehicle body, which further region is spaced apart from the pivot axis. In addition to the suspension of a vehicle axle, the air spring system 1 is also used to change a ride height position of a vehicle. Here, essential constituent parts of the air spring device 2 are preferably a piston 12 and an air bellows 11, it being possible for the air bellows 11 and the piston 12 to be displaced relative to one another. Here, the air bellows 11 rolls on an outer face of the piston 12 in the case of a compression and rebound. To this end, the air bellows 11 is preferably manufactured from an elastic material, by way of which a folding movement can be brought about during the rolling. In addition, a damping action is brought about by virtue of the fact that a fluid, in particular air, flows to and fro via a constricted cross section between a working space which is provided by way of the air bellows and the piston and a chamber which is configured in the piston. The vibrations which are introduced are damped on account of the constricted cross section and the associated friction.

The damping behavior of an air spring device 2 of this type is dependent on the available air volume. In order to increase the volume, it is therefore known to connect the working space to an additional container 4 which provides an additional volume. In particular, the additional container 4 and the air spring device 2 are in a fluidic connection via a fluid duct 9 in the mounted state. It is provided, in particular, that the air spring device 2 is attached to an upper side 21 of the link 3, which upper side 21 faces the chassis, whereas the additional container 4 is attached on a lower side 22 of the link 3, which lower side 22 faces away from the chassis. In order to avoid fixing elements which fill the installation space, it is provided, in particular, that the air spring system 1 has an engagement element 53 in an interface region A, in which the air spring device 2 is attached to the link 3, which engagement element 53 interacts with a positively locking element in a positively locking manner. In the exemplary embodiment which is shown, the engagement element 53 is a hook element which is arranged on an end side of the air spring device 2, in particular of the piston 12, which end side faces the link 3 in the mounted state. Furthermore, the interface region A is configured in such a way that the engagement element 53 is received by a receiving region 51 as a result of a fitting movement (illustrated in FIG. 1a) along the fitting direction AR. The engagement element 53 preferably engages through the receiving region 51 after termination of the fitting movement. Furthermore, the interface region A is designed in such a way that the engagement element 53 is transferred into a positively locking region 63 by way of an offset movement which follows the fitting movement along an offset direction VR which differs from the fitting direction AR. In the positively locking region 63, the engagement element 53 interacts with a positively locking element along a positively locking direction FR. In the example which is shown, a region of the link 3, which region adjoins the receiving region 51, forms the positively locking element 63. As a result, in the mounted state which is illustrated in FIG. 1b, the hook element or the engagement element 53 engages behind the link 3 in regions, and is fixed on the link 3 as a result. It is provided, in particular, that the fitting direction AR runs substantially parallel or antiparallel to the positively locking direction FR. A guide channel 61 is provided for the transfer of the engagement element 53 into the positively locking region 63, along which guide channel 61 that part of the hook element which engages through the link 3 is guided during the transfer and is arranged in the mounted state. It is provided, in particular, that the air spring device 2, in particular the piston 12 of the air spring device 2, is rotated for the transfer into the positively locking region 63. Pin-shaped securing elements 15, for example standard stay bolts which are attached on an end side of the air spring device 2, which end side faces the chassis in the mounted state, are preferably provided in order to avoid reverse rotation of the engagement element.

Figure 2A:
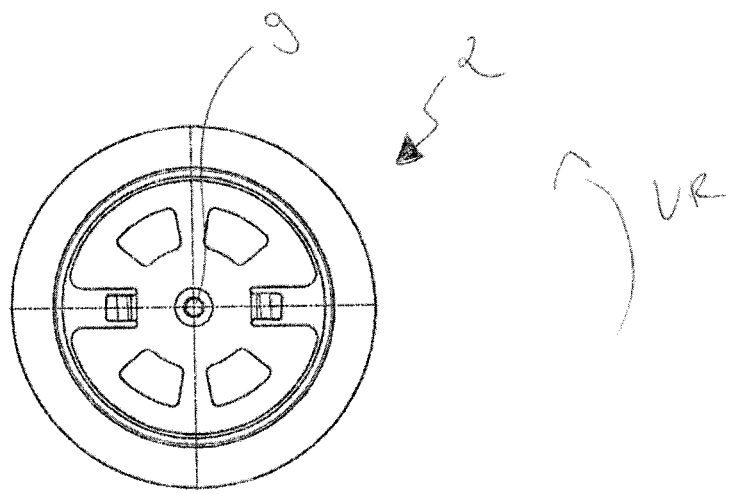
FIGS. 2a and 2b show an air spring device and a link of the air spring system from FIG. 1 in plan views.
Figure 2B:
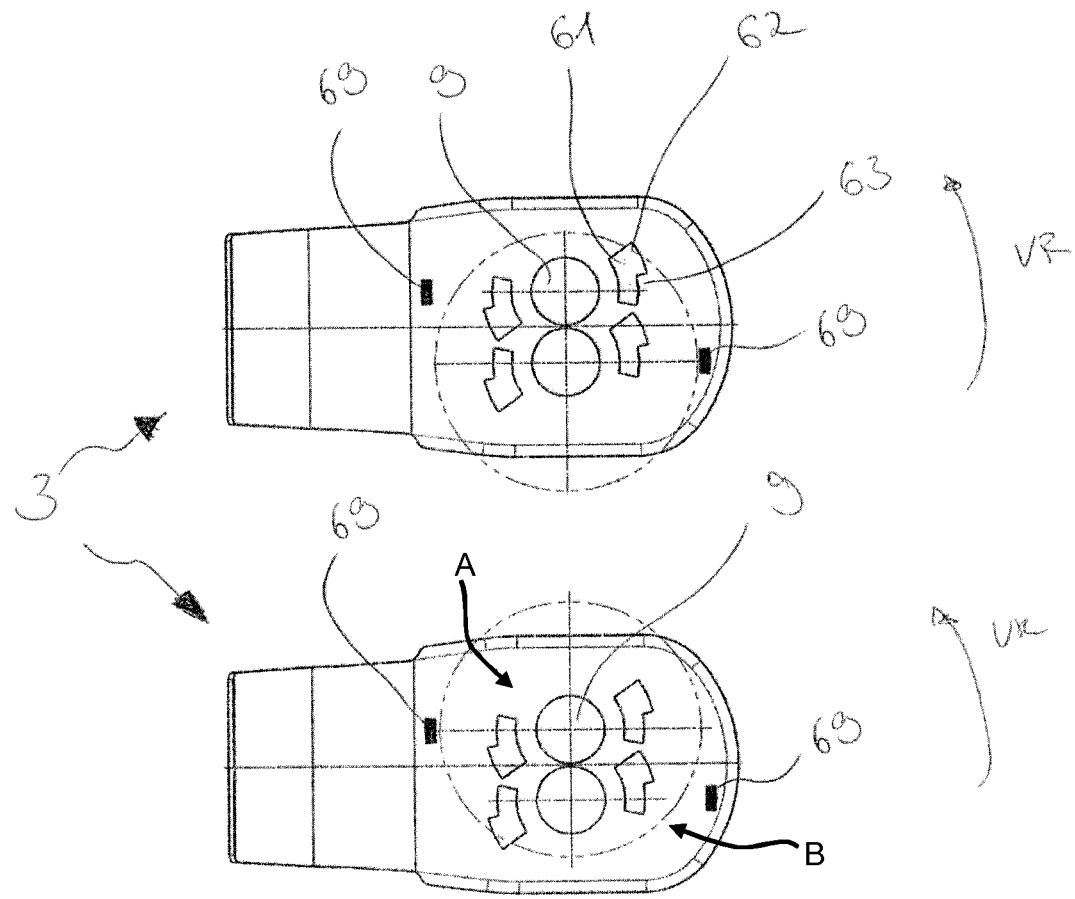

FIG. 2a shows a plan view of that end side of the air spring device 2 which faces the link 3 in the mounted state. Here, in particular, two engagement elements 53 are provided which lie opposite one another and extend in each case radially to the outside toward their end. FIG. 2b shows two illustrations of a link 3 which is of corresponding configuration with respect to the air spring device 2 and, in addition to the interface region A, has a further interface region B which is offset with respect to the interface region A. As a result, the air spring device 2 can be arranged selectively in the interface region A or the further interface region B, preferably in a manner which is dependent on whether the link 3 is arranged on the left hand or right hand side of the vehicle as viewed in the driving direction. To this end, at least twice as many receiving regions 51 and positively locking regions 63 are provided on the link 3 as engagement elements 53 are provided on the link 3. Furthermore, it is provided for a corresponding configuration of the link 3 that, in the radial and circumferential direction, the receiving region 51 is greater than or equal to an area of the engagement element 53, which area is measured in a sectional plane which runs perpendicularly with respect to the fitting direction AR. Furthermore, it is provided in the exemplary embodiment which is shown that the receiving region 51 extends in the circumferential direction substantially precisely as far as the positively locking region 63. Moreover, it is preferably provided that a locking aid for visualizing the orientation of the engagement element in the positively locking region 63 is provided, which locking aid informs the technician of the air spring device 2 about the fact that the air spring device 2 is oriented in such a way that the engagement element 53 has reached the positively locking region 63. For example, the locking aid comprises one or more markings 69 on the link 3 and the air spring device 2, which markings 69 are oriented in a predefined form with respect to one another in the mounted state. It is also conceivable that, when the final state is assumed in the positively locking region 63, the locking aid provides an acoustic signal or a visual signal in the form of an illuminating or extinguishing lamp.

Figure 3:
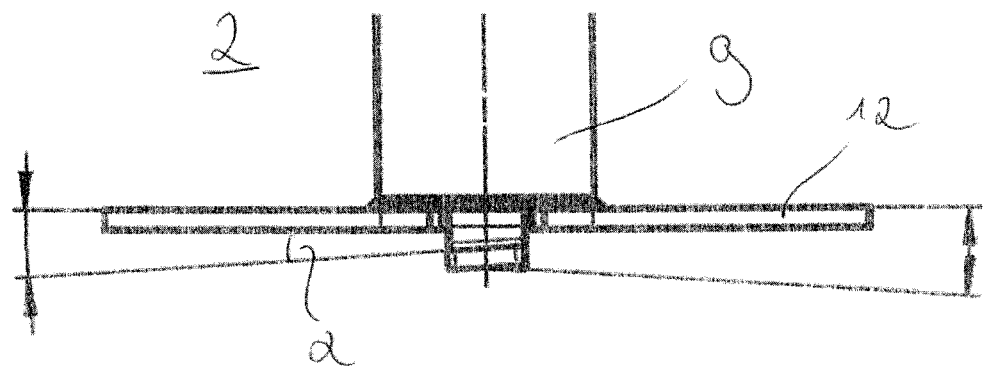

FIG. 3 shows the engagement element 53 for an air spring device 2 from the preceding figures in detail. In order to bring about a certain tolerance compensation and to cause a clamping action in the mounted state, it is provided that the engagement element 53 is inclined by an angle α with respect to a sectional plane which runs parallel to the offset direction VR, the angle α preferably assuming a value between 1.5° and 4.5°, preferably between 0.8° and 2.2°, and particularly preferably between 1.3° and 1.8°.

Figure 4:
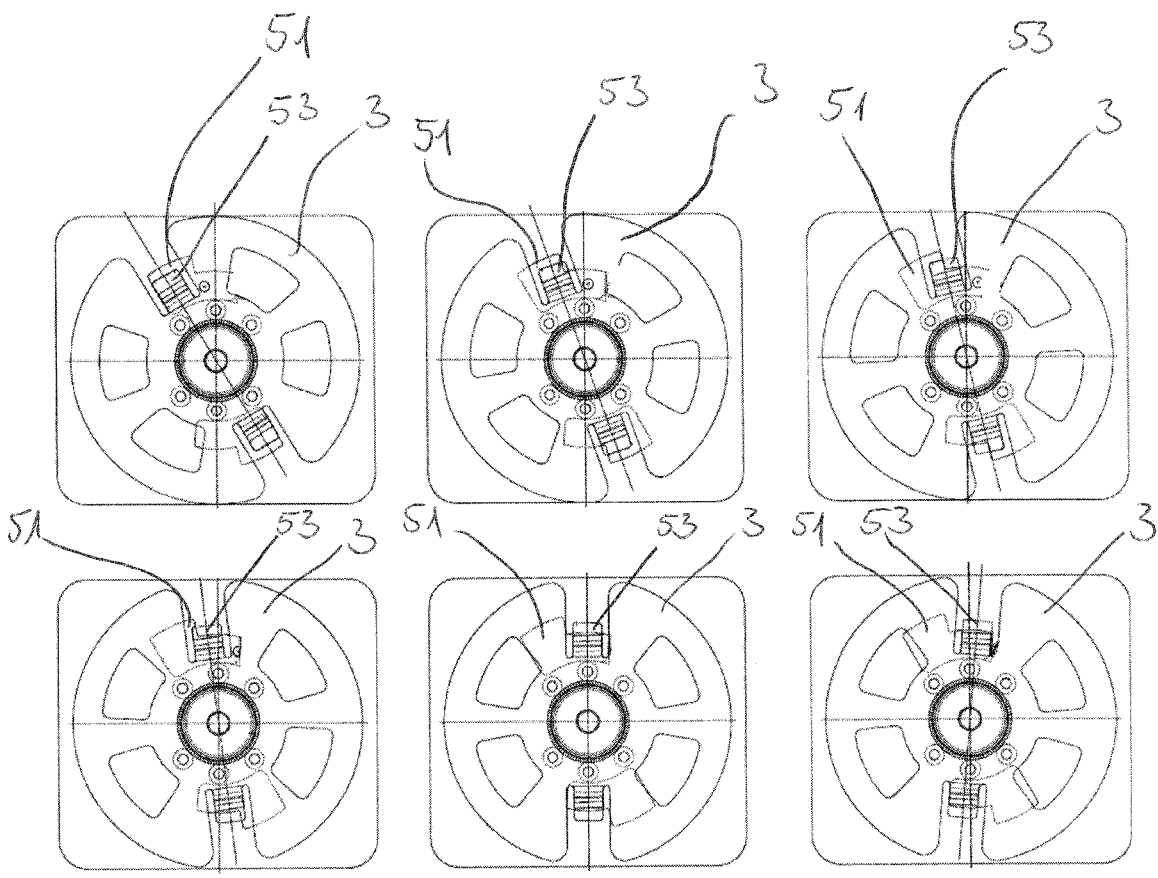
FIG. 4 shows a diagrammatic illustration of a part of a method for mounting an air spring system in accordance with one exemplary embodiment of the present invention.

FIG. 4 diagrammatically shows a part of a method for mounting an air spring system 1 in accordance with one exemplary embodiment of the present invention. In particular, the transfer of the engagement element 53 is illustrated from the receiving region 51 into the positively locking region 63 by way of an offset movement, preferably by way of a rotational movement, along an offset direction VR with the formation of a positively locking connection along a positively locking direction FR which differs from the offset direction VR. Here, the air spring device 2 is rotated gradually with respect to the link 3. Here, the top left of the figure shows the state of the air spring device 2 directly after the fitting of the air spring device 2 by way of a fitting movement. There is no positively locking connection to the link 3 here. The figures which follow in the first row and the two figures on the left hand side in the second row show the air spring device 2 at different times which follow one another during the transfer. Here, an overlap (as viewed in a positively locking direction FR) between the engagement element 53 and the link 3 increases. In the middle figure in the second row, the engagement element 53 already lies completely below the positively locking region 63 as viewed in the positively locking direction FR. In the figure at the bottom right, the engagement element 53 comes into contact with an edge of the link 3.

LIST OF DESIGNATIONS

1 Air spring system
2 Air spring device
3 Link
4 Additional Container
9 Fluid duct
11 Air bellows
12 Piston
15 Pin-shaped securing element
21 Upper side
22 Lower side
51 Receiving region
53 Engagement element
61 Guide channel
63 Positively locking region
69 Marking
A Interface region
B Further interface region
FR Positively locking direction
VR Offset direction
AR Fitting direction
α Angle

The invention claimed is:

1. An air spring system for a commercial vehicle, comprising:
an air spring device arranged in an interface region on a link, the air spring system configured such that, in the case of locking of the air spring device, an engagement element is introduced into a receiving region, and, by way of an offset movement along an offset direction, the engagement element is transferred from the receiving region into a positively locking region, in which the engagement element interacts in a positively locking manner with a positively locking element along a positively locking direction which differs from the offset direction; and
a container which, in the mounted state, is arranged on a lower side of the link, where the lower side is configured to face away from a chassis of the vehicle, the container having a recess in which, in the mounted state of the air spring system, the engagement element is arranged at least partially.

2. The air spring system as claimed in claim 1, further comprising:
a securing mechanism which, in the mounted state, counteracts a movement which is opposed to the offset direction.

3. The air spring system as claimed in claim 2, wherein the engagement element interacts, in the mounted state, in a frictionally locking manner with the positively locking element along a direction which runs parallel to the offset direction.

4. The air spring system as claimed in claim 3, wherein the offset movement is a translational and/or rotational movement.

5. The air spring system as claimed in claim 4, wherein the link includes a receiving region, including a recess for the introduction of the engagement element.

6. The air spring system as claimed in claim 5, wherein a part of the engagement element which engages behind the positively locking element is inclined by an angle with respect to a plane which runs perpendicularly with respect to the fitting direction.

7. The air spring system as claimed in claim 6, wherein the interface region is one of two interface regions.

8. The air spring system as claimed in claim 7, wherein the engagement element is part of the air spring device, and the positively locking element being part of the link.

9. The air spring system as claimed in claim 8, wherein the engagement element engages through the link in the mounted state.

10. The air spring system as claimed in claim 9, wherein the air spring device is configured to be arranged on an upper side of the link, where an upper side of the link is configured to face the chassis.

11. The air spring system as claimed in claim 10, further comprising:
at least one locking aid configured to indicate a mounted state of the air spring device.

12. The air spring system as claimed in claim 1, further comprising:
a fluid duct for the exchange of gas between the air spring device and the container, wherein the engagement element is one of two engagement elements and wherein the fluid duct is arranged between the two engagement elements in the mounted state.

13. The air spring system as claimed in claim 1, wherein the engagement element interacts, in the mounted state, in a frictionally locking manner with the positively locking element along a direction which runs parallel to the offset direction.

14. The air spring system as claimed in claim 1, wherein the offset movement is a translational and/or rotational movement.

15. The air spring system as claimed in claim 1, wherein the link includes a receiving region, including a recess for the introduction of the engagement element.

16. The air spring system as claimed in claim 1, wherein a part of the engagement element which engages behind the positively locking element is inclined by an angle with respect to a plane which runs perpendicularly with respect to the fitting direction.

17. The air spring system as claimed in claim 1, wherein the interface region is one of two interface regions.

18. The air spring system as claimed in claim 1, wherein the engagement element is part of the air spring device, and the positively locking element being part of the link.

19. The air spring system as claimed in claim 1, wherein the engagement element engages through the link in the mounted state.

20. The air spring system as claimed in claim 1, wherein the air spring device is configured to be arranged on an upper side of the link, where an upper side of the link is configured to face the chassis.

21. The air spring system as claimed in claim 1, further comprising:

at least one locking aid configured to indicate a mounted state of the air spring device.

* * * * *